United States Patent
BenHanokh et al.

(10) Patent No.: US 11,947,800 B2
(45) Date of Patent: Apr. 2, 2024

(54) DETERMINING WEIGHTS FOR CACHE STORAGE OF FRAGMENTED DATA

(71) Applicant: Red Hat, Inc., Raleigh, NC (US)

(72) Inventors: Gabriel Zvi BenHanokh, Tel-Aviv (IL); Orit Wasserman, Mitzpe Aviv (IL); Yehoshua Salomon, Kfar Saba (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/512,278

(22) Filed: Oct. 27, 2021

(65) Prior Publication Data

US 2023/0128741 A1    Apr. 27, 2023

(51) Int. Cl.
G06F 3/06    (2006.01)

(52) U.S. Cl.
CPC .......... *G06F 3/0611* (2013.01); *G06F 3/0604* (2013.01); *G06F 3/0646* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,420,983 A | 5/1995 | Noya et al. | |
| 7,634,585 B2 | 12/2009 | Conley et al. | |
| 2007/0005904 A1 | 1/2007 | Lemoal et al. | |
| 2008/0243918 A1* | 10/2008 | Holtman | H04N 9/8042 |
| | | | 386/E5.052 |
| 2009/0172048 A1* | 7/2009 | Tetrick | G06F 3/0676 |
| 2010/0174865 A1* | 7/2010 | Koester | G06F 21/80 |
| | | | 711/170 |
| 2012/0311269 A1* | 12/2012 | Loh | G06F 12/126 |
| | | | 711/E12.017 |
| 2013/0326149 A1* | 12/2013 | Barrell | G06F 11/1076 |
| | | | 711/135 |
| 2020/0042905 A1* | 2/2020 | Gupta | G06F 12/0893 |

FOREIGN PATENT DOCUMENTS

| | | |
|---|---|---|
| JP | 2003131942 A | 5/2003 |
| JP | 4283288 B2 | 6/2009 |
| JP | 2011086324 A | 4/2011 |

OTHER PUBLICATIONS

Vandebogart, S., et al., "Reducing Seek Overhead with Application-Directed Prefetching," UCLA, Downloaded from the Internet Sep. 8, 2021, https://www.usenix.org/legacy/event/usenix09/tech/full_papers/vandebogart/vandebogart_html/index.html.
Sarawagi,S., "Query Processing in Tertiary Memory Databases," Proceedings of the 21st VLDB Conference, Zurich, CH, 1995, https://www.vldb.org/conf/1995/P585.PDF.

* cited by examiner

*Primary Examiner* — Stephanie Wu
(74) *Attorney, Agent, or Firm* — Kilpatrick Townsend & Stockton LLP

(57) ABSTRACT

Fragmented data on a storage device may be additionally stored in a cache. A cache weight for determining storage of a data unit can be determined. For example, a computing device can receive storage device characteristics from a storage device. A data unit comprising multiple fragments may be stored on the storage device. The computing device can receive data unit characteristics from the storage device. The computing device can determine a cache weight for the data unit. The computing device may output the cache weight for determining storage of the data unit in a cache.

17 Claims, 3 Drawing Sheets

DETERMINING WEIGHTS FOR CACHE STORAGE OF FRAGMENTED DATA

TECHNICAL FIELD

The present disclosure relates generally to storage control. More specifically, but not by way of limitation, this disclosure relates to managing cache storage of fragmented data.

BACKGROUND

A computing system can include various types of memory devices, such as drives and caches. The computing system may write data onto and read data from the drive. The computing system can store a copy of the data from the drive in the cache. The cache may have a relatively low latency compared to the drive and may be volatile (i.e., the cache can lose its data when powered off). Reading and writing data from the cache may be faster and less computationally expensive than reading and writing data from the drive. In some examples, the data stored in the drive may become fragmented. As data is added, removed, or changed in the drive, available space in the drive may not be contiguous and may be fragmented into smaller spaces. The computing device may write data to available space in the drive such that fragments of the data are stored in non-contiguous locations on the drive.

DETAILED DESCRIPTION

Figure 1:
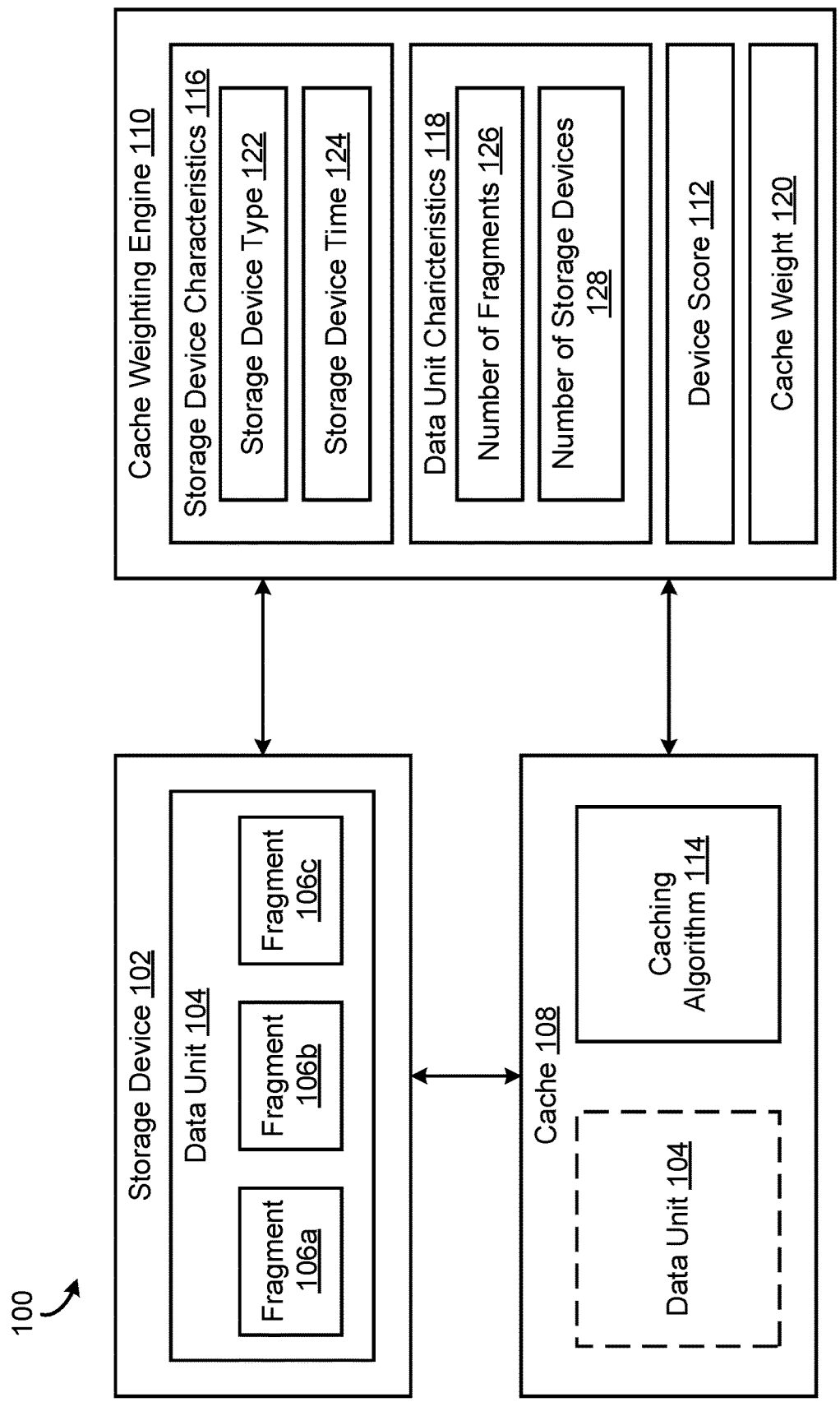
FIG. 1 is a block diagram of an example of a computing environment for determining cache weights for a data unit according to some aspects of the present disclosure.

A computing device may store data from a storage device such as a drive onto a cache. In some examples, accessing the data stored in the cache may be faster than accessing the data stored in the drive. But the cache may have a relatively small amount of memory. Caching algorithms may be used to determine which data to remove from the cache to make room for new data. An example of a common caching algorithm is the least recently used algorithm, where the data in the cache that has least recently been used by the computing system is replaced with new data. But caching algorithms may not differentiate between fragmented or non-fragmented data. Reading fragmented data from a drive may take longer and be more computationally expensive than reading data that is not fragmented. For example, a data unit stored on a hard disk drive in ten fragments may take ten times longer to read than a non-fragmented data unit. In another example, reading a fragmented data unit on a solid state drive may require a separate request for each fragment, which may increase the amount of time required to read the data unit. In some examples, copies of fragmented data may be least recently used and may therefore be removed from the cache, but accessing the fragmented data from the drive can take significantly longer than accessing a copy of the fragmented data in the cache. Data in the cache that is relatively less recently used but computationally expensive to write to the cache or read from the storage device may be removed from the cache, which may decrease performance of the computing device.

Some examples of the present disclosure can overcome one or more of the abovementioned issues by determining cache weights for data units that may be fragmented on a drive. The cache weights may be used in caching algorithms for determining which data units to discard from the cache. For example, the caching algorithm may determine a prioritization order for storage or removal of the data units. Data units with higher cache weights may be stored in the cache longer than data units with lower cache weights. Prioritizing the storage of fragmented data units in the cache may reduce seek time and latency for the computing device.

The computing device may determine cache weights based on data unit characteristics and drive characteristics. Examples of the data unit characteristics may include the number of fragments that the data unit has been split into on the drive. Examples of the drive characteristics may include the type of drive. For example, the drive may be a solid state drive or a hard disk drive. Each drive type may be associated with a user-inputted score. For example, seek time for a hard disk drive may be greater than seek time for a solid state drive. Therefore, a score for a hard disk drive may be greater than a score for a solid state drive. The computing device may determine a cache weight for a data unit based on the score and the number of fragments. For example, the cache weight may be equal to the score multiplied by the number of fragments.

In some examples, the cache weight determination may include additional factors. In some examples, the drive characteristics may include a storage time, which may be an amount of time required to read or write the data unit on the drive. The storage time may be higher if the drive is in a remote location. Higher storage times may be associated with higher cache weights, as it may be beneficial to prioritize storage of data units that take longer to access. In other examples, the data unit characteristics may include fragment locations. For example, a single data unit may be split into fragments that are stored on separate drives, which may increase difficulty of access. Higher amounts of fragment locations may be associated with higher cache weights.

In some examples, the computing device may utilize the cache in a write back mode, in which the computing device writes a data unit to the cache first and writes the data unit to the drive by reading from the cache at a later time. The computing device may determine a number of fragments that the data unit would be split into if the data unit was written to the drive. The computing device may use the potential number of fragments in determining the cache weight for the data unit. The cache weight may then be used to prioritize holding the data unit in the cache without writing the data unit to the drive until enough space is available in the drive to reduce or eliminate fragmentation of the data unit.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a computing environment 100 for determining a cache weight 120 for a data unit 104 according to some aspects of the present disclosure. The computing environment 100 can include a storage device 102, a cache 108, and a cache weighting engine 110. Examples of the computing environment 100 can include a desktop computer, a laptop, a mobile phone, a server, etc. Examples of the storage device 102 can include a hard disk drive, a solid-state drive, a flash drive, etc. In some examples, the storage device 102, the cache 108, and the cache weighting engine 110 may communicate over a network, such as a local area network (LAN) or the internet.

In some examples, the storage device 102 may include a data unit 104. The data unit 104 may be separated into fragments 106a-c. Each fragment may be stored at a non-contiguous location on the storage device 102. The seek time for reading or writing the data unit 104 on the storage device 102 may increase with each additional fragment 106. Although three fragments 106a-c are depicted in FIG. 1, the data unit 104 may include more or fewer fragments 106. When reading the data unit 104 from or writing the data unit 104 to the storage device 102, the computing environment 100 may additionally store the data unit 104 in the cache 108. Accessing (e.g., reading from or writing to) the data unit 104 from the cache 108 may be relatively faster than accessing the data unit 104 from the storage device 102. But the cache 108 may have limited space. The cache 108 may utilize a caching algorithm 114 to determine which data units to delete from the cache 108 in order to store new data units.

The cache weighting engine 110 may receive storage device characteristics 116 and data unit characteristics 118 from the storage device 102. The cache weighting engine 110 may use the storage device characteristics 116 and the data unit characteristics 118 to determine a cache weight 120 for the data unit 104. The cache weight 120 may be used by the cache 108 to determine if the cache 108 should discard the data unit 104. For example, the cache 108 may incorporate the cache weight 120 into the caching algorithm 114. The storage device characteristics 116 include a storage device type 122. Examples of a storage device type 122 include a hard disk drive or a solid state drive. The cache weighting engine 110 may determine a device score 112 based on the storage device type 122. For example, a hard disk drive may have a device score of 1.0 and a solid state drive may have a device score of 0.2, as reading or writing operations can be completed faster by a solid state drive. In some examples, the storage device characteristics 116 additionally include a storage device time 124. The storage device time 124 may be an amount of time needed to access a data unit 104 on a storage device 102. For example, a remote storage device 102 may have a higher storage device time 124. A data unit 104 with a higher storage device time 124 may have a higher cache weight 120, as it may be advantageous to store the data unit 104 in the cache 108 longer rather than accessing the data unit 104 from a remote storage device 102.

The data unit characteristics 118 can include a number of fragments 126 for the data unit 104 in the storage device 102. A data unit 104 with a higher number of fragments 126 may have a higher cache weight 120, as accessing the data unit 104 from the cache may be faster than accessing the fragmented data unit 104 from the storage device 102. In some examples, the data unit characteristics 118 can include a number of storage devices 128. For example, the data unit 104 may be split into fragments located on multiple storage devices. The computing environment 100 may read the fragments from each storage device to access the entire data unit 104. A data unit 104 with a greater number of storage devices 128 may have a higher cache weight 120, as it may be beneficial to store the data unit 104 in the cache 108 longer rather than accessing the data unit 104 from multiple storage devices.

In some examples, the cache weighting engine 110 may determine the cache weight 120 using the device score 112 and the number of fragments 126. For example, the cache weight 120 may be the device score 112 multiplied by the number of fragments 126. Additionally, the cache weight 120 may be calculated using the storage device time 124, the number of storage devices 128, or any other storage device characteristics 116 or data unit characteristics 118. The cache weighting engine 110 may then output the cache weight 120 for the data unit 104 to be used in managing storage of the cache 108. For example, the cache weighting engine 110 may transmit the cache weight 120 to the cache 108. The cache 108 may update the caching algorithm 114 using the cache weight 120. For example, the caching algorithm 114 may prioritize storing a data unit with a higher cache weight over a data unit with a lower cache weight.

In some examples, the computing environment 100 may operate in a write-through mode to write a data unit 104 to the storage device 102 and to the cache 108 at the same time. Alternatively, the computing environment 100 may operate in a write-back mode by only writing the data unit 104 to the cache initially. When the caching algorithm 114 determines that the data unit 104 in the cache 108 is to be replaced, the computing environment 100 may write the data unit 104 in the cache 108 to the storage device 102. In this example, the cache weighting engine 110 may determine the cache weight 120 from storage device characteristics 116 by determining a projected number of fragments 126 in which the data unit 104 may be stored on the storage device 102. The cache weighting engine 110 may determine a higher cache weight 120 for the data unit 104 for higher projected numbers of fragments 126. In this manner, the data unit 104 may be stored in the cache 108 until a less fragmented storage area in the storage device 102 becomes available.

FIG. 1 is illustrative and non-limiting. Other examples may include more components, fewer components, different components, or a different arrangement of the components shown in FIG. 1. For example, although the computing environment 100 includes one storage device 102 and one data unit 104 in the example of FIG. 1, the computing environment 100 may include a larger number of storage devices and data units in other examples.

Figure 2:
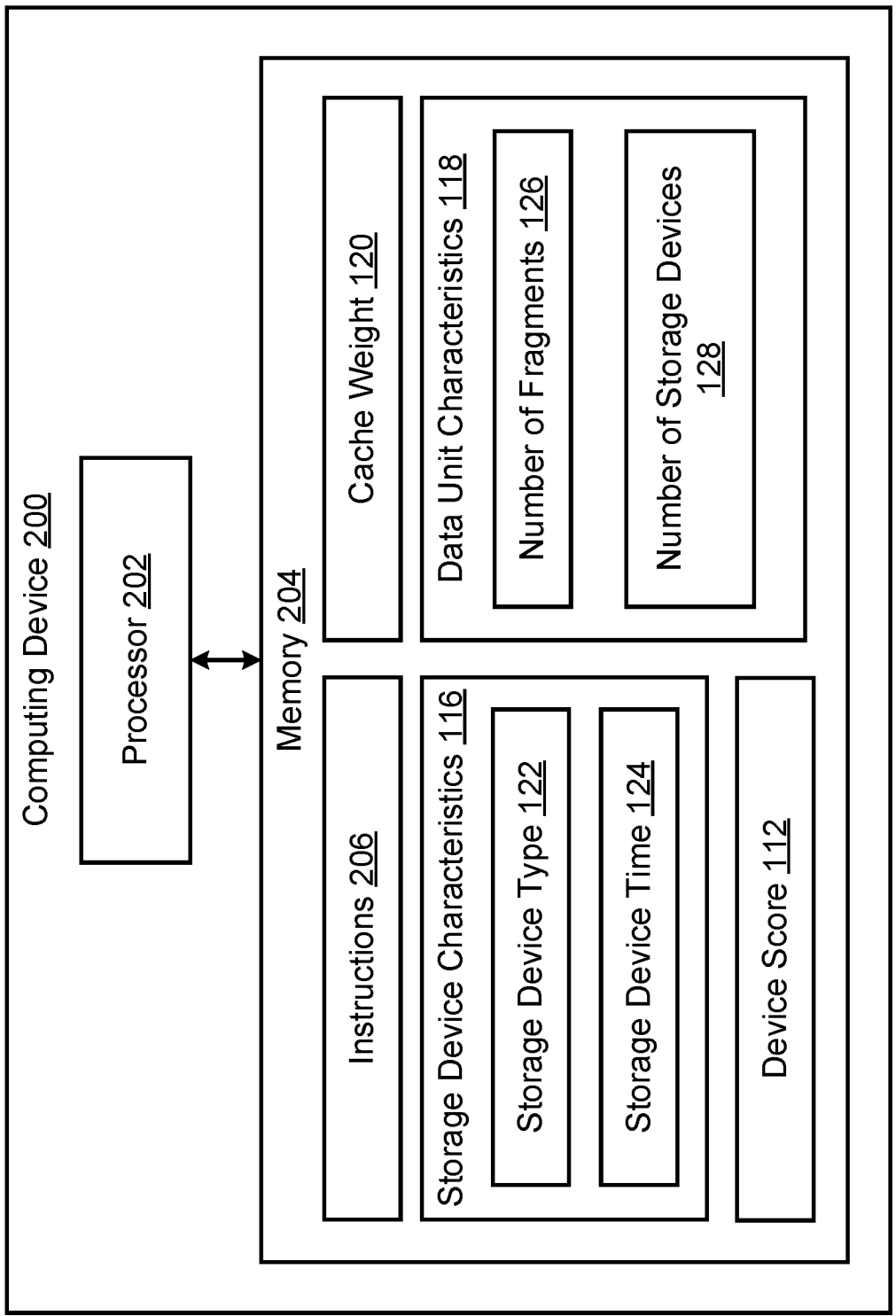
FIG. 2 is a block diagram of an example of a computing device for determining data unit weights for a cache according to some aspects of the present disclosure.

FIG. 2 is a block diagram of an example of a computing device 200 for determining a cache weight 120 for a data unit 104 according to some aspects of the present disclosure. The computing device 200 may be part of a computing environment, such as the computing environment 100 in FIG. 1.

The computing device 200 includes a processor 202 that is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can execute the cache weighting engine 110 of FIG. 1. The processor 202 may receive storage device characteristics 116 and data unit characteristics 118 from the storage device 102. The storage device characteristics 116 may include a storage device type 122 and a storage device time 124. The data unit characteristics 118 may include a number of fragments 126 in the data unit 104 and a number of storage devices 128 storing the number of fragments 126. The processor 202 may determine a cache weight 120 for a data unit 104 in the storage device 102. For example, the processor 202 may determine a device score 112 based on the storage device type 122. The processor 202 may determine a cache weight 120 by multiplying the device score 112 by the number of fragments 126. The processor 202 may output the cache weight 120 for use in determining storage of the data unit 104 in the cache 108.

Figure 3:
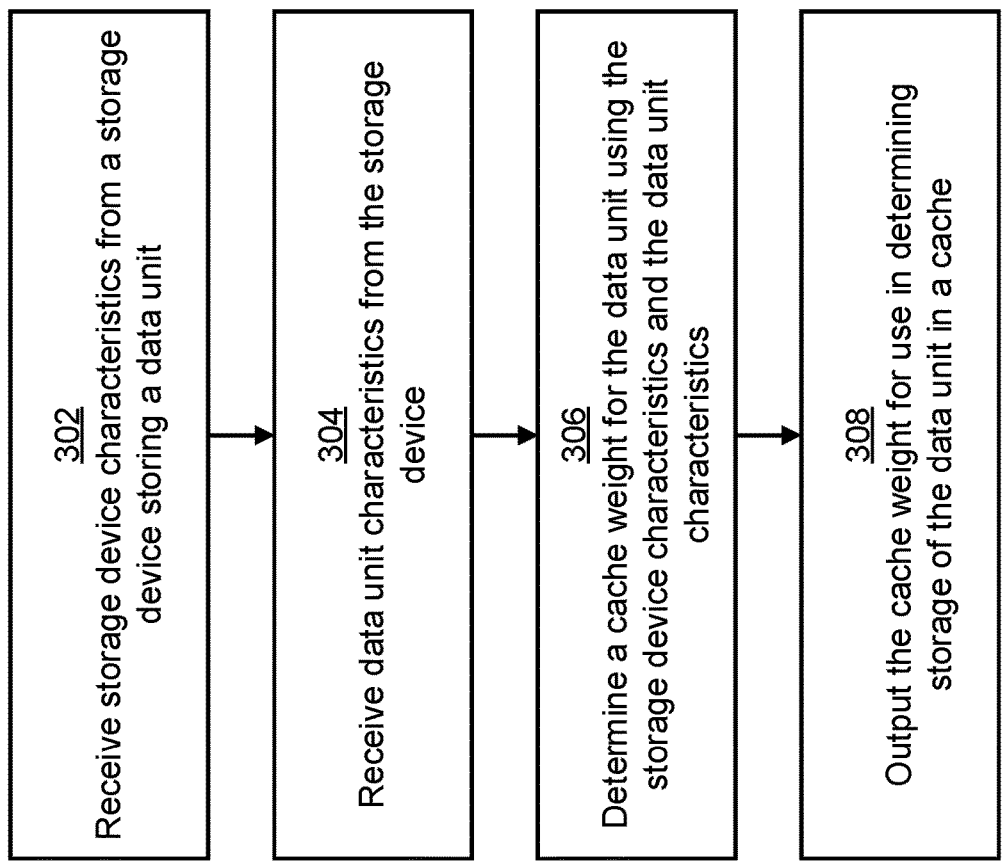
FIG. 3 is a flow chart showing an example of a process for determining data unit weights for a cache according to some aspects of the present disclosure.

The processor 202 can implement some or all of the steps shown in FIG. 3. Other examples can include more, fewer, or different steps than the steps depicted in FIG. 3. The steps below are described with reference to components described above with regard to FIGS. 1-2.

Turning to FIG. 3, in block 302, the processor 202 receives storage device characteristics 116 from a storage device 102 storing a data unit 104. The data unit 104 may be stored in multiple fragments 106a-c. In some examples, the data unit 104 may be additionally stored on a cache 108. The storage device characteristics 116 may include a storage device type 122, such as a hard disk drive or a solid state drive. The storage device characteristics 116 may further include a storage device time 124, which may be an amount of time for the processor 202 to access (e.g., read from or write all fragments 106a-c of) the data unit 104 in the storage device 102.

In block 304, the processor 202 receives data unit characteristics 118 from the storage device 102. The data unit characteristics 118 may include a number of fragments 126 for the data unit 104 in the storage device 102. The data unit characteristics 118 may further include a number of storage devices 128 storing fragments 106 of the data unit 104. For example, a first storage device may store fragments 106a-b of the data unit 104, and a second storage device may store fragment 106c of the data unit 104. Therefore, the number of storage devices 128 for the data unit 104 may be two.

In block 306, the processor 202 determines a cache weight 120 for the data unit 104 using the storage device characteristics 116 and the data unit characteristics 118. For example, the processor 202 may determine a device score 112 for the storage device 102 based on the storage device type 122. The device score 112 may be associated with a difficulty of accessing the data unit 104 from the storage device type 122. The processor 202 may determine the device score 112 by accessing a predefined table inputted by a user that maps storage device types 122 to device scores 112. The processor 202 may determine the cache weight 120 to be the device score 112 multiplied by the number of fragments 126. Other non-limiting examples may include the processor 202 additionally or alternatively determining the cache weight 120 based the storage device time 124 and the number of storage devices 128.

In block 308, the processor 202 outputs the cache weight 120 for use in determining storage of the data unit 104 in a cache 108. For example, the processor 202 may output the cache weight 120 to the cache 108. The cache 108 may incorporate the cache weight 120 into a caching algorithm 114 for determining data units to remove and replace with new data units. A data unit 104 with a higher cache weight 120, such as a data unit 104 with multiple fragments 105, a hard disk drive storage device type 122, a high storage device time 124, and a high number of storage devices 128, may be stored in the cache 108 longer than a data unit 104 that is not fragmented. In some examples, the fragmented data unit 104 may be stored longer than the non-fragmented data unit 104, even if the fragmented data unit 104 is accessed by the processor 202 less frequently than the non-fragmented data unit 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a processor; and
    a memory including instructions that are executable by the processor for causing the processor to:
        receive, from at least one storage device storing a data unit, a plurality of storage device characteristics comprising a storage device type of the at least one storage device, the data unit comprising a plurality of fragments stored in non-contiguous locations on the at least one storage device, wherein the data unit is additionally stored in a cache;
        receive, from the at least one storage device, a plurality of data unit characteristics;
        determine a device score associated with a difficulty of accessing the data unit from the storage device type;
        determine, using the plurality of storage device characteristics and the plurality of data unit characteristics, a cache weight for the data unit based on the device score;
        update a caching algorithm with the cache weight for the data unit, the updated caching algorithm configured to determine a prioritization order for data units to be removed from the cache; and
        determine, based on the prioritization order, a removal of the data unit from the cache.

2. The system of claim 1, wherein the plurality of storage device characteristics further comprises a storage device time that is an amount of time for accessing the data unit from the at least one storage device, wherein the plurality of data unit characteristics comprises a number of the plurality of fragments in the data unit and a number of the at least one storage device storing the plurality of fragments in the data unit.

3. The system of claim 2, wherein the memory further includes instructions that are executable by the processor for causing the processor to:
    determine the cache weight by multiplying the device score by the number of the plurality of fragments.

4. The system of claim 1, wherein the cache further comprises a second data unit that is not stored on the at least one storage device, and wherein the plurality of data unit characteristics further comprises a potential number of the plurality of fragments in which the second data unit would be stored on the at least one storage device.

5. The system of claim 4, wherein the cache weight is a first cache weight, and wherein the memory further includes instructions that are executable by the processor for causing the processor to:
   determine a second cache weight for the second data unit by multiplying the potential number of the plurality of fragments by the device score;
   update the caching algorithm with the second cache weight for the second data unit; and
   determine, based on the prioritization order determined by the caching algorithm using the second cache weight, a removal of the second data unit from the cache and a storage of the second data unit in the at least one storage device.

6. The system of claim 1, wherein a first fragment of the plurality of fragments for the data unit is stored on a first storage device and a second fragment of the plurality of fragments for the data unit is stored on a second storage device.

7. A method comprising:
   receiving, by a processor and from at least one storage device storing a data unit, a plurality of storage device characteristics comprising a storage device type of the at least one storage device, the data unit comprising a plurality of fragments stored in non-contiguous locations on the at least one storage device, wherein the data unit is additionally stored in a cache;
   receiving, by the processor and from the at least one storage device, a plurality of data unit characteristics;
   determining, by the processor, a device score associated with a difficulty of accessing the data unit from the storage device type;
   determining, by the processor and using the plurality of storage device characteristics and the plurality of data unit characteristics, a cache weight for the data unit based on the device score;
   updating, by the processor, a caching algorithm with a cache weight for the data unit, wherein the updated caching algorithm determines a prioritization order for data units to be removed from the cache; and
   determining, by the processor and based on the prioritization order, a removal of the data unit from the cache.

8. The method of claim 7, wherein the plurality of storage device characteristics further includes a storage device time that is an amount of time for accessing the data unit from the at least one storage device, and wherein the plurality of data unit characteristics includes a number of the plurality of fragments in the data unit and a number of the at least one storage device storing the plurality of fragments in the data unit.

9. The method of claim 8, further comprising:
   determining the cache weight by multiplying the device score by the number of the plurality of fragments.

10. The method of claim 7, wherein the cache further includes a second data unit that is not stored on the at least one storage device, and wherein the plurality of data unit characteristics further includes a potential number of the plurality of fragments in which the second data unit would be stored on the at least one storage device.

11. The method of claim 10, wherein the cache weight is a first cache weight, and wherein the method further comprises:
   determining a second cache weight for the second data unit by multiplying the potential number of the plurality of fragments by the device score;
   updating the caching algorithm with the second cache weight for the second data unit; and
   determining, based on the prioritization order determined by the caching algorithm using the second cache weight, a removal of the second data unit from the cache and a storage of the second data unit in the at least one storage device.

12. The method of claim 7, wherein a first fragment of the plurality of fragments for the data unit is stored on a first storage device and a second fragment of the plurality of fragments for the data unit is stored on a second storage device.

13. A non-transitory computer-readable medium comprising program code that is executable by a processor for causing the processor to:
   receive, from at least one storage device storing a data unit, a plurality of storage device characteristics comprising a storage device type of the at least one storage device, the data unit comprising a plurality of fragments stored in non- contiguous locations on the at least one storage device, wherein the data unit is additionally stored in a cache;
   receive, from the at least one storage device, a plurality of data unit characteristics;
   determine a device score associated with a difficulty of accessing the data unit from the storage device type;
   determine, using the plurality of storage device characteristics and the plurality of data unit characteristics, a cache weight for the data unit based on the device score;
   update a caching algorithm with the cache weight for the data unit, the updated caching algorithm configured to determine a prioritization order for data units to be removed from the cache; and
   determine, based on the prioritization order, a removal of the data unit from the cache.

14. The non-transitory computer-readable medium of claim 13, wherein the plurality of storage device characteristics further comprises a storage device time that is an amount of time for accessing the data unit from the at least one storage device, and wherein the plurality of data unit characteristics comprises a number of the plurality of fragments in the data unit and a number of at least one storage device storing the plurality of fragments in the data unit.

15. The non-transitory computer-readable medium of claim 14, wherein the program code further comprises instructions that are executable by the processor for causing the processor to:
   determine the cache weight by multiplying the device score by the number of the plurality of fragments.

16. The non-transitory computer-readable medium of claim 13, wherein the cache further comprises a second data unit that is not stored on the at least one storage device, and wherein the plurality of data unit characteristics further comprises a potential number of the plurality of fragments in which the second data unit would be stored on the at least one storage device.

17. The non-transitory computer-readable medium of claim 16, wherein the cache weight is a first cache weight, and wherein the program code further comprises instructions that are executable by the processor for causing the processor to:
- determine a second cache weight for the second data unit by multiplying the potential number of the plurality of fragments by the device score;
- update the caching algorithm with the second cache weight for the second data unit; and
- determine, based on the prioritization order determined by the caching algorithm using the second cache weight, a removal of the second data unit from the cache and a storage of the second data unit in the at least one storage device.

\* \* \* \* \*